Jan. 23, 1962

L. L. HERCIK 3,017,797

MATERIAL SHEARING APPARATUS

Filed July 30, 1959

INVENTOR.
LAD L. HERCIK
BY
Myer, Baldwin, Doran & Young
ATTORNEYS

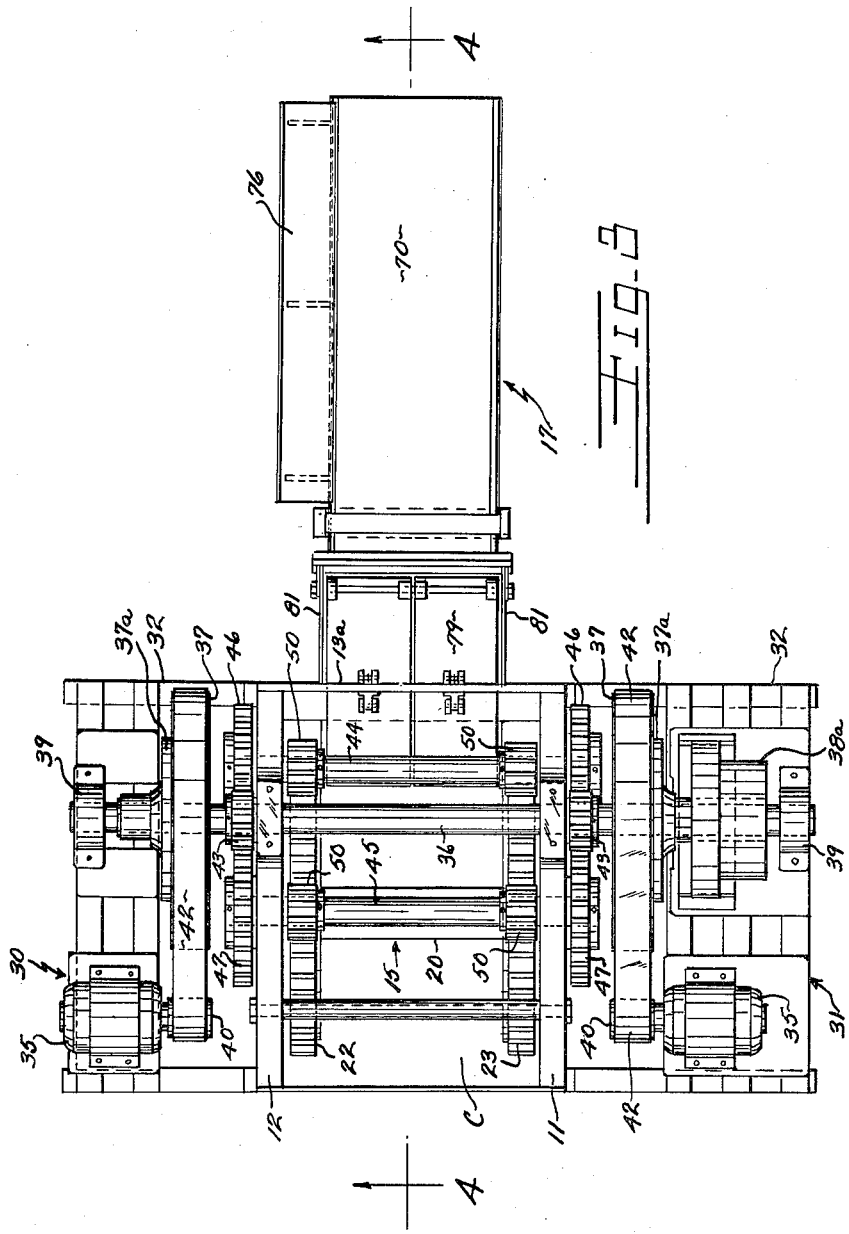

Jan. 23, 1962
L. L. HERCIK
3,017,797
MATERIAL SHEARING APPARATUS
Filed July 30, 1959
3 Sheets-Sheet 3
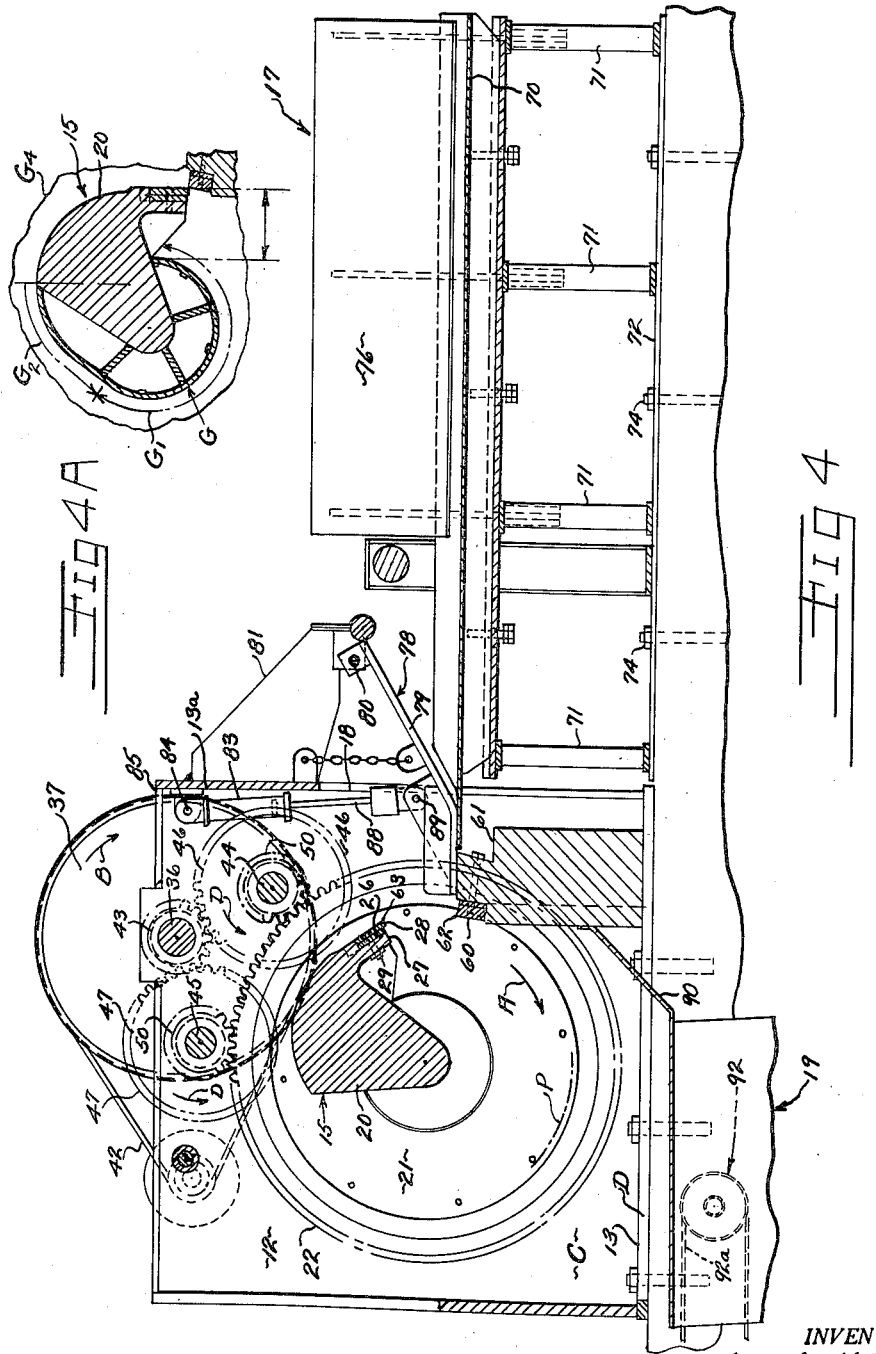
INVENTOR.
LAO L. HERCIK
BY
Meyer, Baldwin, Doan & Young
ATTORNEYS 3,017,797
MATERIAL SHEARING APPARATUS
Lad L. Hercik, Lakewood, Ohio (% The Hill Acme Co., 1201 W. 65th St., Cleveland 2, Ohio)
Filed July 30, 1959, Ser. No. 830,556
6 Claims. (Cl. 83—349)

This invention relates to material shearing apparatus and more particularly to a rotary shear especially designed to shear metallic sheets, bars and the like and wherein the shearing means is carried through a circular path and the material to be sheared thereby is presented to said shearing means so as to be intercepted by the latter in said path.

It is a primary object of the present invention to provide a novel and improved rotary shearing apparatus for shearing metallic sheets, bars and the like wherein the shearing means is carried through a circular working path.

Another object of the present invention is the provision of a novel and improved rotary shearing apparatus for shearing metallic sheets, bars and the like wherein the shearing means is carried through a circular working path, and the material to be sheared thereby is presented to said shearing means so as to intercept said working path.

Still another object of the present invention is the provision of a new and improved material shearing apparatus as above described, and wherein the shearing means comprises a shearing blade which is carried through a circular working path, and the material to be sheared thereby is presented to said blade so as to intercept said path once per each revolution thereof.

Yet another object of the present invention is the provision of a new and improved material shearing apparatus wherein the shearing means comprises a shearing blade which is driven through a circular work path, the material to be sheared thereby is presented to said blade once per each revolution thereof, and further wherein said blade is provided with gauge means operable to automatically regulate the length of material to be sheared by said blade. One specific use of this novel shearing apparatus is to cut up mixed metal scrap into desirable shorter lengths.

Another object of the present invention is the provision of a novel and improved material shearing apparatus as above described, and wherein the shearing blade is rotatably driven through a circular work path and receives its power through a substantially large rotating mass, the inertia of which tends to sustain the rotation of said blade in said path and thus provide large forces to said blade effective to readily shear the material presented thereto.

Another object of the present invention is the provision of a novel and improved material shearing apparatus as above defined and wherein the shearing blade is carried by and mounted between a pair of drive gears of substantial mass, said gears rotating at a speed effective to present large shearing forces to said blade, said gears, in turn, being power driven in such manner that the shearing blade carried therebetween tends to be literally pushed downwardly into the material being sheared.

Additional objects and advantages of the shearing apparatus of the present invention will be realized by one skilled in the art to which it pertains and upon reference to the following disclosure of a preferred embodiment thereof and which is illustrated in the accompanying drawings, and wherein;

FIG. 3 is a top plan view of the same;

FIG. 4 is a side elevational view in section taken approximately along the plane indicated by line 4—4 in FIG. 3; and FIG. 4a is a side elevational view in section of a modified form of shearing means especially adapted for use with the shearing apparatus of the present invention.

Figure 1:
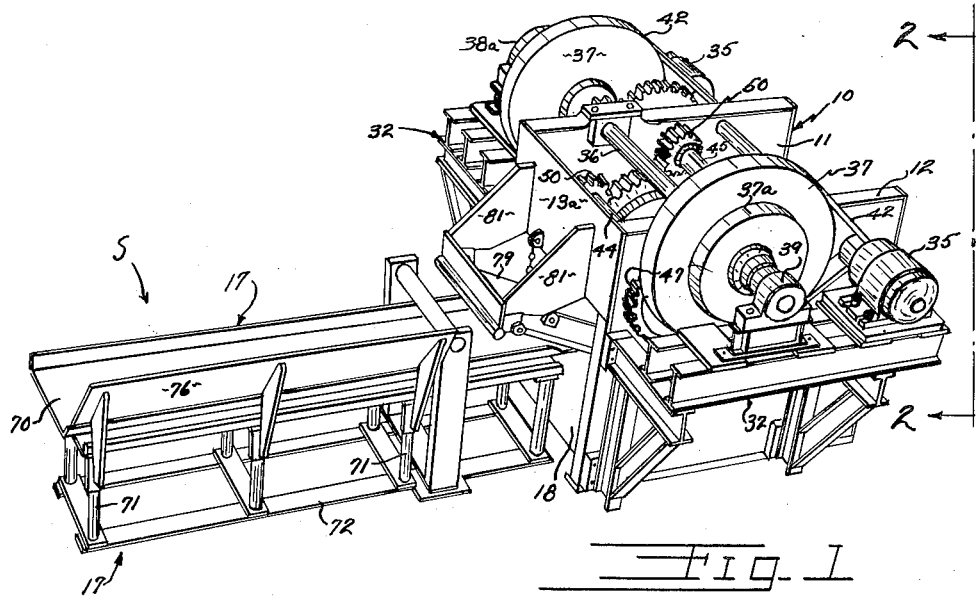
FIG. 1 is a side perspective view of a material shearing apparatus embodying the concepts of the present invention.

Referring now to the application drawings throughout which like elements are designated by the same reference character, the rotary shearing apparatus of the present invention is herein shown particularly in FIG. 1, to include a box-like housing identified in its entirety by the reference numeral 10 and which is preferably made from a suitable metal of substantial mass such as iron, and which housing includes a pair of side walls 11 and 12 integrally formed with a base 13 as to stand upwardly therefrom in substantially parallel spaced relation, said walls projecting longitudinally along the opposed side edges of said base.

The aforesaid housing is adapted to rotatably mount a rotary shearing means identified in its entirey by the reference numeral 15, the interior of said housing hence defining a shearing chamber as indicated at C, into which the material to be sheared is presented to said shearing means.

A suitable conveyor 17, which has its discharge end, as best seen in FIG. 4, extending through the mouth 18 of the shearing chamber C, provided in the housing front wall 13a, is preferably utilized to continuously feed the material to be sheared into said chamber, and hence into the working path of the shearing means 15.

Preferably, in addition, suitable conveying means, as indicated by the reference numeral 19 in FIG. 4, is located at the discharge opening D of the shearing chamber C to thus enable the sheared material to be rapidly carried away from said apparatus.

Figure 2:
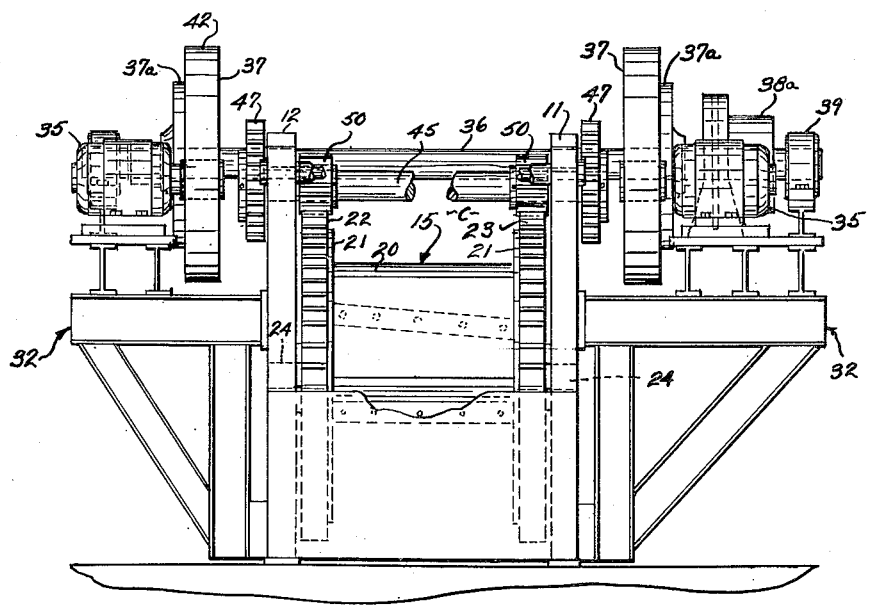
FIG. 2 is an end view in elevation of the material shearing apparatus of FIG. 1 and taken approximately along line 2—2 of FIG. 1.

With particular reference now directed to FIGS. 2 and 4, the instant form of shearing means 15 is seen to include a drum-like assembly comprising a blade carrier 20 suspended centrally between and rigidly fastened to a pair of disc members 21. Each of said discs is, in turn, seen to be rigidly attached to the inside face of one of a pair of external driving gears 22 and 23. A trunnion 24 is rigidly fastened to the center of each driving gear so as to extend outwardly therefrom.

The drum assembly as just described, is centrally disposed within the shearing chamber C of the housing 10, each of said trunnions being rotatably journaled within one of the housing side walls 11 and 12 as to locate said driving gears directly opposite one another and closely adjacent the inner face of said housing walls to thus suspend the drum assembly centrally with said shearing chamber.

As best seen in FIG. 4, the blade carrier 20 is somewhat parabolic in cross-sectional configuration with its vertex lying preferably on the center of the drum assembly so as to locate substantially all of its mass to one side of said axis. As will also be seen in FIG. 4, the blade carrier 20 is provided with a recess 26 formed on the leading outer edge of a lip 27 formed thereon, said recess extending across said lip and accommodating a shearing blade 28, the latter being rigidly fastened to said carrier by means of fasteners 29. In the disclosed embodiment, the configuration of the blade carrier 20 is preferably of such parabolic form as to concentrate substantially all of its mass within an area of 90 degrees bounded on one side by the leading drum face mounting the aforesaid blade 28 and on the opposite side by the trailing drum face.

The drum assembly is intended to be rotatably driven in a clockwise direction as indicated by the arrow A in FIG. 4, and in this manner it will be seen that substantially all of the mass of the blade carrier 20 is immediately rearwardly of the shearing blade as it is carried through its circular work path, the latter being indicated by the circular line identified by the reference character P.

As above mentioned, the instant rotary shearing apparatus is primarily intended to shear miscellaneous lengths of steel plates, bars and the like. For example, to show the capacity of this shear, steel bars of approximately 4" thickness and 24" steel I beams have been sheared by this apparatus. Consequently, it is preferably desirable to have each of the aforesaid driving gears 22 and 23 individually driven by separate driving means so that the power as applied to the shearing means 15 is not concentrated at either end of the same which could possibly result in large torsional forces being applied to the drum assembly thereof once the shearing blade makes initial contact with the material to be sheared, which forces could possibly cause said assembly to become twisted or otherwise damaged.

For this purpose, a drive unit is provided for each of the aforesaid driving gears, said units being identified herein by the reference numerals 30 and 31 respectively.

As each of the drive units 30 and 31 is identical, a detailed description of drive unit 30 only will be hereinafter defined.

Drive unit 30, as well as drive unit 31, is seen to include a suitable power source preferably in the form of an electric motor 35, each of which, as is best seen in FIG. 1, is securely mounted on one end of a supporting platform 32 fastened to each of the housing side walls 11 and 12, said motors being preferably connected in parallel in an electrical circuit and in circuit with a suitable source of electrical energy (not shown), so as to be simultaneously energized.

Each of said motors 35 is drivingly connected to its associated driving gear, the motor of drive unit 30 being connected to gear 22, and motor of drive unit 31 likewise connected to gear 23. For this purpose, a shaft 36 is rotatably mounted in the housing 10, extending substantially transversely across the shearing chamber C, and suitably journaled adjacent the ends thereof in the aforesaid housing sidewalls 11 and 12. Said shaft freely rotatably mounts a fly wheel 37 adjacent each of its ends exteriorly of the said housing sidewalls, and adjacent each of the motors 35. The ends of the shaft 36, as is best seen in FIGS. 1 and 2, are each suitably journaled within a bearing block 39 also carried on each of the aforesaid supporting platforms 32.

A drive pulley 40 is seen to be mounted on the shaft of each electric motor 35 and an endless belt 42 is passed therearound and also around the periphery of the fly wheel 37 adjacent thereto. Hence, by energizing said motors 35, the flywheels 37 are also rotated about the shaft 36.

It is preferred that the drive units 30 and 31 be so constructed that the power delivered by the motors 35 to the flywheels 37 may be selectively applied to the driving gears 22 and 23. For this purpose therefore, a suitable clutch 37a is carried on each end of the shaft 36 and has its clutch parts connectible with said shaft and the flywheel 37 disposed adjacent thereto. Any suitable clutch assembly may be used, for instance, a pneumatically operated clutch identified as the Fawick 33VC650 clutch and which utilizes a fluid cushion between its clutch parts to transmit the power therebetween, has been found to be adequate for the instant embodiment of shearing apparatus.

With this assembly, it will be seen that upon energization of the motors 35 to effect the rotation of the flywheels 37, each of said clutches, as interconnected between the latter and the shaft 36 hence also causes said shaft to rotate in the same direction.

It is further intended that the clutches 37a be disengaged so as to disconnect the shaft 36 from the flywheels 37, and to provide suitable braking means to effect a rapid stopping of said shaft.

To accomplish the aforesaid stopping of said shaft 36, a suitable brake, as identified in its entirety by the reference numeral 38a, is mounted on one of the supporting platforms 32 as is best seen in FIG. 3, and is connectible with said shaft. As is apparent, any suitable braking means may be utilized, for example, an electromechanical brake identified as a Fawick Dual 28VC650 brake has been found to be adequate for this purpose. By actuating the brake 38a so as to engage the shaft 36, said shaft may be rapidly "braked" to a complete stop, if so desired.

As will be understood, suitable control means, not herein specifically shown, are provided to thus enable a selective control of the aforesaid clutches and brake components 37a and 38a, respectively.

For example, in each of the Fawick clutches above referred to, a fluid cushion acts to transmit the power between the clutch parts connected to the shaft 36 and one of the flywheels 37. Hence, suitable valve means must be provided for the selective application of said fluid to the aforesaid cushion.

In like manner, the aforesaid Fawick brake component is electrically controlled to engage or disengage its braking parts with the shaft 36. Consequently, suitable switch or relay means must be provided for the selective application of said brake to the shaft 36.

To connect said control means in a unitary electrical control circuit, the clutch components may be actuated by any suitable means such as an electrical solenoid actuated fluid control valve which is normally in its actuated condition effective to provide fluid to said clutch cushion and connect the shaft 36 to the flywheels 37. In like manner, any suitable electrical relay or switch means may be provided for the brake component, and which is normally disposed in its de-actuated condition to thus disconnect the brake from said shaft 36 when the clutch parts are actuated and likewise energized to brake said shaft when the clutch parts are de-actuated. Said control means are preferably operable such that the de-actuation of the cluch control valve is operable to provide for the energization of the brake control relay or switch to thus cause the brake to engage with the shaft 36 only when said clutch has been de-actuated. Consequently, the de-energizing of the brake control is intended to be operative to cause the actuation of the clutch control.

In this manner, the brake component cannot be applied to the shaft 36 until the clutches have first been de-actuated to disconnect said shaft from the flywheels 37, and conversely, said clutches cannot be actuated before the aforesaid brake is first de-energized.

As best seen in FIG. 4, a drive pinion 43 is mounted on each end of the aforesaid shaft 36 so as to rotate with the same, being interposed thereon between the flywheel 37 and the adjacent housing sidewall. A pair of shafts 44 and 45 is also rotatably journaled at the ends thereof within the housing side walls 11 and 12, in such manner as to extend substantially transversely across the aforesaid shearing chamber C in substantially parallel spaced relation to each other and in equally spaced relation on opposite sides of the aforesaid shaft 36. As seen particularly in FIGS. 1 and 4, each of said shafts 44 and 45 is located adjacent to and above the periphery of the driving gears 22 and 23.

Each of said shafts 44 and 45, in addition, mounts a pair of transfer gears 46 and 47 respectively, said gears being located adjacent the outer face of the housing side walls 11 and 12, and as is best seen in FIG. 4, one gear of each pair of said transfer gears is in meshing engagement with one of the drive pinions 43 on one end of shaft 36. Said transfer gears mesh with each of the aforesaid drive pinions 43 at spaced points along the periphery thereof so as to be rotatably driven in the same direction. For example, with a clockwise rotation being given to the flywheels 37 as indicated by the arrow B in FIG. 4, each of the drive pinions 43 on shaft 36 will also be rotated in a clockwise manner so as to rotate the transfer gears 46 and 47 in a counterclockwise direction as indicated by the arrow D.

The shaft members 44 and 45 each mount a drive gear 50 adjacent each of the ends thereof within the shearing chamber C, and directly above one of the driving gears 22 and 23 of the shearing means 15. Each of said gears 50 is of such configuration and size as to intermesh with the gear teeth formed on the periphery of its associated drive gear 22 or 23.

As seen in FIG. 4, the aforesaid shaft members 44 and 45 are preferably disposed within the housing 10 so as to locate the gears 50 carried thereon, above and to the right of the center of the drum assembly. Or, as may be further defined, the gears 50 mesh with the aforesaid driving gears 22 and 23 at spaced points along the periphery thereof, which points are seen to be above and between the center of said driving gears and the discharge end of the inlet feed conveyor 17.

In this manner therefore, the driving forces as transmitted to said gears 22 and 23 by the above defined gear train have components acting in a downward direction which act to literally push the shearing blade 28 through the material being sheared.

It will now be realized, as may be best seen in FIG. 4, that upon energization of the motors 35 of the drive units 30 and 31, in such manner as to rotate the flywheels 37 in a clockwise direction as indicated by the aforementioned arrow B, the above defined gear train will hence be operative to positively drive each of the drive gears 22 and 23 in a clockwise direction as indicated by arrow A and hence rotate the shearing means in a clockwise circular working path P within the housing shearing chamber C.

In this manner therefore substantially equal driving forces are applied to each end of the aforesaid shearing means to thus rotatably drive the latter.

As will also be realized, with the large flywheels 37 interposed in the drive train between the motor power source and the aforesaid drive gears 22 and 23, the inertia generated by said flywheels is transmitted to said drive gears and hence tends to sustain the shearing means 15 in rotation at a substantially constant speed and thereby aid in the shearing of the material presented thereto.

Although I prefer to use separate driving units 30 and 31 to apply driving forces to each side of the drive assembly, there may be times, for example, when it is desirable to shear small gage or soft metal or the like, and in this instance only one of the drum units 30 and 31 may be utilized if desired to provide sufficient magnitudes of driving forces to effect a proper rotation of the drum assembly and shearing blade carried thereby to readily shear said material.

In one embodiment of shearing apparatus constructed in accordance with the inventive concepts as are disclosed herein, a total kinetic energy of approximately 880,000 ft. lb. has been delivered to the shearing means 15 by using a flywheel weight of approximately 2500 pounds for each of the flywheels 37, and a 50 horsepower electric motor for each of the electric motors 35. The gear train in this instance is of such a predetermined ratio that with the electric motors 35 energized, a rotational speed of approximately 12 r.p.m. is given to the shearing means 15.

To provide for a proper and a clean shearing of the metallic material as it is presented to the rotating shearing blade, a fixed anvil 60 is seen to be rigidly fastened to an upright pedestal 61, said anvil extending substantially transversely completely across the shearing chamber C of the housing 10 in such manner as to present its knife edge 62 in close juxtaposition to the working path P through which the shearing blade is rotatably carried. As will be understood, said shearing blade is likewise provided with a sharpened knife edge, as is indicated at 63, the latter of which cooperates with the aforesaid knife edge 62 on the anvil 60 to thus provide a well defined shearing cut to the material presented thereto.

With particular reference directed to FIG. 4, it will be therein seen that the anvil 60 is so mounted on the aforesaid supporting pedestal 61 such that the knife edge thereon is located below a horizontal plane passing through the center of the drum assembly. With this particular location for said anvil, and with the particular configuration of the instant blade carrier, wherein a substantial portion of the mass of said carrier is located just rearwardly of the shearing blade as it is rotated through its working path P, it will be realized that the shearing blade first passes through said horizontal plane, just prior to passing said anvil.

Consequently, at the instant the shearing blade passes said anvil to shear the material therebetween, maximum shearing forces are hence being applied thereto.

As will further be realized, with the anvil 60 disposed below the aforementioned horizontal plane extending through the blade carrier center, the shearing blade 28 is beginning to move away from said anvil as it sweeps by the same. As a result, the shearing stroke of the blade 28 is not at right angles to the top surface of the material but rather at an angle so as to provide a clean sheared surface which originates at said top surface of said material and thence projects downwardly and to the left as viewed in FIG. 4.

As before mentioned, inlet feed conveyor means are provided as indicated in its entirety by the reference numeral 17, to provide a substantially continuous feeding of material to the shearing chamber C and hence to the rotating shearing means 15.

For this purpose, the form of inlet feed conveyor means utilized herein is seen to be what is generally classified in the art as a horizontal conveyor having a conveyor bed 70 supported in a horizontal plane by means of spaced pairs of upright stanchion members 71, the latter being securely fastened to a base 72 which, in turn, is rigidly attached to the supporting floor by means of fasteners 74.

The discharge end of the conveyor bed 70, extends into the shearing chamber C, being preferably fastened to the pedestal 61 just rearwardly of the anvil 60, and although not herein specifically shown, said conveyor bed is intended to be vibrated to and fro of the mouth 18 of the housing 10 in such manner as to feed a preselected length of material into the shearing chamber of said housing for each revolution of the shearing means 15.

In case the material is to be deposited on the feed conveyor from other conveying means not herein shown, and from a direction laterally of said conveyor, as indicated by the arrow S in FIG. 1, an upright striker panel 76 is securely fastened along the back side of said conveyor and hence is in position to intercept said material and thereby provide for its being properly deposited on the aforesaid conveyor bed 70.

As will also be realized, as the material is fed into the shearing chamber C of the housing 10, and thus sheared by the rotating shearing means 15, said material upon impact of the shearing blade will tend to scatter or fly and hence possibly cause injury to the operator. To prevent this from happening, the instant shearing apparatus is provided with a hold down mechanism as indicated in its entirety by the reference numeral 78 and which includes a hold down platen 79 hingeably attached at its rearward end at 80 to a pair of brackets 81 mounted on the front wall 13a of the housing 10 preferably above the mouth 18 of the shearing chamber C. As seen particularly in FIG. 4, the platen is preferably hingeably mounted in the manner just described such that its front portion extends forwardly through the aforesaid mouth 18 and into the shearing chamber C so as to preferably rest upon the upper face of the aforementioned pedestal 61 slightly rearwardly of the anvil 60 carried thereon.

The material as thus fed into the mouth 18 of the shearing chamber C is carried by the conveyor bed 70 until it strikes the aforesaid platen and is then operable to swing the same upwardly about its hingeable connection 80. In this manner the material to be sheared is sandwiched between said conveyor bed and said platen.

A suitable pressure fluid motor as indicated at 83 is seen to have its cylinder pivotally attached at 84 to a boss 85 carried on the inner face of the housing front wall 13a and in like manner the free end of its piston rod 88 is pivotally fastened at 89 to the aforesaid platen.

With this construction, it will be realized that with the proper actuation of said fluid pressure motor, a downwardly directed pressure may be applied to said platen, as viewed in FIG. 4, to thus swing the same toward the underlying conveyor bed 70 and pedestal 61 to thus result in firmly capturing the material therebetween. In this manner as said material is being sheared it is prevented from flying out of the shearing chamber C upon initial impact of the rotating shearing blade, and hence prevents injury thereby to the operator and/or adjoining parts of said shearing apparatus.

As previously mentioned, the rotary shearing apparatus of the present invention is also provided with conveyor means 19 for rapidly discharging the sheared material out of and away from the shearing chamber C of the housing 10.

With particular reference directed to FIG. 4, the shearing chamber C is seen to be provided with a discharge opening D. A suitable chute, as identified by the reference numeral 90, has its one end extending upwardly through said discharge opening D and into the shearing chamber C, preferably abutting against the front face of the aforesaid pedestal 61 whereat it is securely fastened. Said chute is seen to project outwardly of the said chamber and under the housing 10. A suitable endless conveyor belt, as indicated at 92 and disposed below said chute, has its upper run 92a located so as to receive said sheared material as it comes down said chute.

As was previously mentioned, the instant rotary shearing apparatus is primarily intended to shear miscellaneous lengths of metallic scrap material such as steel plates, bars and the like, one of the ultimate uses for said scrap material being to provide a suitable length of said material in preparing a charge for a steel making furnace or the like. It has been determined that lengths of scrap material up to approximately 18" in length is preferred when using said material as part of a furnace charge.

For this purpose therefore, the rotary shearing apparatus of the present invention may be provided with novel gage means which are operable to permit approximately 18" of material to be fed into the shearing chamber C per each shearing stroke of the shearing means 15.

With particular reference directed to FIG. 4a, a preferred form of said gage means is herein shown, as is identified in its entirety by the reference character G, and which is seen to be rigidly attached to the blade carrier 20 of the shearing means 15 in a particular manner as will be hereinafter described in detail and which gage means is operable to intercept the material as it is fed into the shearing chamber C by the inlet feed conveyor 17 to thus permit a length of approximately 18" of said material to be intendable into said chamber before it is sheared by the aforesaid shearing means.

With particular reference directed to FIG. 4a, the instant form of gage means G is herein shown to comprise a band of rigid material, preferably a metallic material so as to withstand impacts from the material to be sheared as it is fed into the shearing chamber C, said band being preferably substantially as wide as the blade carrier 20, and having a circular portion $G_1$ connected at its one end to said blade carrier and having its center coinciding with the center of said carrier. Said gage means is also shown to have an arcuate portion $G_2$ of non-circular configuration integrally attached at its end of smaller radius with the aforesaid circular portion $G_1$ and rigidly secured by welding or the like at its opposite end of greater radius to said blade carrier at a point on the periphery of said blade carrier remote from the shearing blade 28, and in such manner that the peripheral surface of said carrier, as indicated at $G_4$, said surface also being of non-circular configuration relative to the center of the blade carrier, meets with the surface of said non-circular poriton $G_2$ and hence the circular portion $G_1$ of said gaging means to thus define a smooth gage surface.

With this construction, it will now be realized, that with a clockwise rotation given to the shearing means 15 as seen in FIG. 4a the surface $G_4$ of the blade carrier 20 is first carried past the anvil 60 and thereafter the non-circular and circular portions $G_2$ and $G_1$, respectively, are carried past said anvil. In this manner therefore, when looking into the shearing chamber C through its mouth 18, one would see a solid moving transverse wall which, as the shearing means 15 is rotated in the above direction, gradually moves away from the anvil 60 until the circular portion $G_1$ begins to pass thereby. At that time, said wall ceases to move away from said anvil, and thus defines a predetermined gaging distance between the knife edge 63 of said anvil and the surface of said portion $G_1$. This distance, therefore defines the maximum length of material that may be extended by the conveyor 17 into the shearing chamber C per each shearing stroke of the shearing means 15. In cutting material for furnace charging boxes, the radius of the circular portion $G_1$ of the means G is preselected such that the distance between its surface and the knife edge 63 on the anvil 60 is preferably 18 inches, the length of the sheared stock preferred for a furnace charge, as is above mentioned.

Assuming that the shearing means 15 has just completed a working stroke to carry the shearing blade 28 past the anvil 60 to shear a predetermined length of material, it will now be seen that as the material next to be sheared is extended into the shearing chamber C, it abuts, first against the surface $G_4$ of the blade carrier 20 as the latter continues to rotate, and thence is gradually extendable into said chamber as it engages with said surfaces $G_4$ and $G_2$, as the latter successively pass the aforesaid anvil 60. Said material next abuts the circular surface portion $G_1$ of the gaging means and is thereby prevented from projecting any further into the said shearing chamber. And, as the blade carrier continues to rotate, it next carries the shearing blade 28 into shearing engagement with the said material to thus complete the shearing stroke or cycle and thus provide the above preferred length of sheared stock.

As will be apparent, any piece of scrap material whose length is less than 18" may or may not be sheared by the shearing means 15, depending upon during what part of the shearing stroke it is introduced into the shearing chamber C.

As will be further realized, the maximum rate at which the inlet feed conveyor 17 may feed material into the shearing chamber C depends in some respects upon the rotational speed of the shearing means 15.

Merely as illustrative of this relationship in the aforementioned embodiment of shearing apparatus, wherein a rotational speed of approximately 12 r.p.m. has been preselected for the shearing means 15, the inlet feed conveyor 17, in order to provide lengths of sheared stock of the above preferred dimension, must be able to feed approximately (12 x 18") or 18 feet of stock to said chamber per minute.

Having thus described in detail a preferred embodiment, it is understood that the rotary shearing apparatus of the present invention is susceptible of various modification, combinations and arrangements of parts without departing from the inventive concepts as are described hereinabove and defined in the following claims.

What is claimed is:

1. A rotary shear for shearing metallic plates, bars and the like, comprising a housing defining a shearing chamber, said housing being formed with means defining an inlet communicating with said shearing chamber, a vibratable conveyor connecting at its one end with said inlet and shearing chamber and extending approximately horizontally outwardly therefrom, said conveyor being vibratable to and fro of said housing inlet to continuously feed material to said shearing chamber, shearing means comprising an anvil carried on said housing having a knife-like edge extending across said chamber to define a shearing plane, a blade carrier parabolic in cross-sectional configuration disposed in said chamber and extending thereacross and rotatably mounted at its vertex to opposite sides of said housing and above said shearing plane, a shearing blade carried on the leading edge of said blade carrier, the cross sectional configuration of said blade carrier being of such parabolic form as to concentrate its mass within an area bounded on one side by a straight line connecting the center of rotation of said carrier and said shearing blade and on the opposite side by a straight line extending outwardly from said center and radially displaced not more than 90 degrees about said center rearwardly from said shearing blade, drive means for rotatably driving said blade carrier in a predetermined direction of rotation at a velocity of approximately 12 revolutions per minute thereby carrying said shearing blade through a circular shearing stroke and through said plane effective to shear said metallic material between said blade and anvil, said blade carrier being rotatably mounted as to locate substantially all of its mass rearwardly of said shearing blade as said blade passes through said shearing plane to thereby provide a maximum shearing force to said blade.

2. A rotary shear for shearing metallic plates, bars and the like, comprising a housing defining a shearing chamber, said housing being formed with means defining an inlet communicating with said shearing chamber, a vibratable conveyor connecting at its one end with said inlet and shearing chamber and extending approximately horizontally outwardly therefrom, said conveyor being vibratable to and fro of said housing inlet to continuously feed material to said shearing chamber, shearing means comprising an anvil carried on said housing having a knife-like edge extending across said chamber to define a shearing plane, a blade carrier parabolic in cross-sectional configuration disposed in said chamber and extending thereacross and rotatably mounted at its vertex to opposite sides of said housing and above said shearing plane, a shearing blade carried on the leading edge of said blade carrier, the cross sectional configuration of said blade carrier being of such parabolic form as to concentrate its mass within an area bounded on one side by a straight line connecting the center of rotation of said carrier and said shearing blade and on the opposite side by a straight line extending outwardly from said center and radially displaced not more than 90 degrees about said center rearwardly from said shearing blade, drive means for said shearing means including flywheel means releasably connected in energy transfer relation to said blade carrier and effective to drive said blade carrier in a predetermined direction of rotation at a velocity of approximately 12 revolutions per minute thereby carrying said shearing blade through a circular shearing stroke, and through said plane effective to shear metallic material between said blade and anvil, said blade carrier being rotatably mounted so as to locate substantially all of its mass rearwardly of said shearing blade as said blade passes through said shearing plane to thereby provide a maximum shearing force to said blade.

3. A rotary shear for shearing metallic plates, bars and the like, comprising a housing defining a shearing chamber, said housing being formed with means defining an inlet communicating with said shearing chamber, a vibratable conveyor connecting at its one end with said inlet and shearing chamber and extending approximately horizontally outwardly therefrom, said conveyor being vibratable to and fro of said housing inlet to continuously feed material to said shearing chamber, shearing means comprising an anvil carried on said housing having a knife-like edge extending across said chamber to define a shearing plane, a blade carrier parabolic in cross-sectional configuration disposed in said chamber and extending thereacross and rotatably mounted at its vertex to opposite sides of said housing and above said shearing plane, a shearing blade carried on the leading edge of said blade carrier, the cross sectional configuration of said blade carrier being of such parabolic form as to concentrate its mass within an area bounded on one side by a straight line connecting the center of rotation of said carrier and said shearing blade and on the opposite side by a straight line extending outwardly from said center and radially displaced not more than 90 degrees about said center rearwardly from said shearing blade, drive means for said shearing means including a power source, flywheel means in driveable engagement with said power source and releasably connected in energy transfer relation to said blade carrier, said flywheel means being driven by said power source so as to drive said blade carrier in a predetermined direction of rotation at a velocity of approximately 12 revolutions per minute thereby carrying said shearing blade through a circular shearing stroke, and through said shearing plane effective to shear said metallic material between said blade and anvil, said blade carrier being rotatably mounted so as to locate substantially all its mass rearwardly of said shearing blade as said blade passes through said shearing plane to thereby provide a maximum shearing force to said blade.

4. A rotary shear for shearing metallic plates, bars and the like, comprising a housing defining a shearing chamber, said housing being formed with means defining an inlet communicating with said shearing chamber, a vibratable conveyor connecting at its one end with said inlet and shearing chamber and extending approximately horizontally outwardly therefrom, said conveyor being vibratable to and fro of said housing inlet to continuously feed material to said shearing chamber, shearing means comprising an anvil carried on said housing having a knife-like edge extending across said chamber to define a shearing plane, a blade carrier suspended in said chamber and including a solid drum substantially parabolic in cross section and having a leading drum face and a trailing drum face, means defining an axle at the vertex of said drum, said axle being journalled at its ends to opposite sides of said housing and above said shearing plane, a shearing blade carried on the leading edge of said leading drum face, the cross sectional configuration of said blade carrier being of such parabolic form as to concentrate its mass within an area bounded on one side by a straight line connecting the center of rotation of said carrier and said shearing blade and on the opposite side by a straight line extending outwardly from said center and radially displaced not more than 90 degrees about said center rearwardly from said shearing blade (a framework on said drum being of substantially less mass than said drum and having a gaging surface coextensive with the peripheral drum surface extending between the said leading and trailing faces thereof, said gaging surface being operable to engage the material entering said chamber so as to enable a gradual introduction of the same therein, drive means operable to drive said blade carrier in a predetermined direction of rotation at a velocity of approximately 12 revolutions per minute thereby carrying said shearing blade through a circular shearing stroke, and through said shearing plane effective to shear said metallic material between said blade and anvil, said blade carrier being rotatably mounted so as to locate substantially all of its mass rearwardly of said shearing blade as said blade passes through said shearing plane to thereby provide a maximum shearing force to said blade.

5. A rotary shear for shearing metallic plates, bars and the like, comprising a housing defining a shearing chamber, said housing being formed with means defining an inlet communicating with said shearing chamber, a vibratable conveyor connecting at its one end with said inlet and extending approximately horizontally outwardly therefrom, said conveyor being vibratable to and fro of said housing inlet to continuously feed material to said shearing chamber, shearing means comprising an anvil carried on said housing having a knife-like edge extending across said chamber to define a shearing plane, a blade carrier suspended in said chamber and including a solid drum substantially parabolic in cross section and having a leading drum face and a trailing drum face, means defining an axle at the vertex of said drum, said axle being journalled at its ends to opposite sides of said housing and above said shearing plane, a shearing blade carried on the leading edge of said leading drum face, the cross sectional configuration of said blade carrier being of such parabolic form as to concentrate its mass within an area bounded on one side by a straight line connecting the center of rotation of said carrier and said leading drum face and on the opposite side by a straight line extending outwardly from said center and connecting said trailing drum face, and being radially displaced not more than 90 degrees about said center rearwardly from said shearing blade, a framework on said drum being of substantially less mass than said drum and having a gaging surface coextensive with the peripheral drum surface extending between the said leading and trailing faces thereof, said gaging surface extending rearwardly from said trailing face and around said vertex, said gaging surface being operable to engage the material entering said chamber so as to enable a gradual introduction of the same therein, drive means operable to drive said blade carrier in a predetermined direction of rotation at a velocity of approximately 12 revolutions per minute thereby carrying said shearing blade through a circular shearing stroke, and through said shearing plane effective to shear said metallic material between said blade and anvil, said blade carrier being rotatably mounted so as to locate substantially all of its mass rearwardly of said shearing blade as said blade passes through said shearing plane to thereby provide a maximum shearing force to said blade.

6. A rotary shear for shearing metallic plates, bars and the like, comprising a housing defining a shearing chamber, said housing being formed with means defining an inlet communicating with said shearing chamber, a vibratable conveyor connecting at its one end with said inlet and extending approximately horizontally outwardly therefrom, said conveyor being vibratable to and fro of said housing inlet to continuously feed material to said shearing chamber, shearing means comprising an anvil carried on said housing having a knife-like edge extending across said chamber to define a shearing plane, a blade carrier suspended in said chamber and including a solid drum substantially parabolic in cross section and having a leading drum face and a trailing drum face, means defining an axle at the vertex of said drum, said axle being journalled at its ends to opposite sides of said housing and above said shearing plane, a shearing blade carried on the leading edge of said leading drum face, the cross sectional configuration of said blade carrier being of such parabolic form as to concentrate its mass within an area bounded on one side by a straight line connecting the center of rotation of said carrier and said leading drum face and on the opposite side by a straight line extending outwardly from said center and connecting said trailing drum face, and being radially displaced not more than 90 degrees about said center rearwardly from said shearing blade, a framework on said drum being of substantially less mass than said drum and having a gaging surface coextensive with the peripheral drum surface extending between the said leading and trailing faces thereof, a first part of said gaging surface being disposed in variable radial spaced relation to said drum vertex, a second part of said gaging surface being disposed in constant radial spaced relation to said vertex, said gaging surface being operable to engage the material entering said chamber so as to enable a gradual introduction of the same therein, drive means operable to drive said blade carrier in a predetermined direction of rotation at a velocity of approximately 12 revolutions per minute thereby carrying said shearing blade through a circular shearing stroke, and through said shearing plane effective to shear said metallic material between said blade and anvil, said blade carrier being rotatably mounted so as to locate substantially all of its mass rearwardly of said shearing blade as said blade passes through said shearing plane to thereby provide a maximum shearing force to said blade.

References Cited in the file of this patent
UNITED STATES PATENTS

| | | |
|---|---|---|
| 181,993 | Soule | Sept. 5, 1876 |
| 1,119,180 | Kraugh | Dec. 1, 1914 |
| 1,301,964 | Overbury | Apr. 29, 1919 |
| 1,371,843 | Blist | Mar. 15, 1921 |
| 2,242,887 | Holdgate et al. | May 20, 1941 |
| 2,635,694 | Calhoun et al. | Apr. 21, 1953 |
| 2,751,981 | Hawkins | June 26, 1956 |
| 2,786,527 | Bruns | Mar. 26, 1957 |